(12) United States Patent
Jang

(10) Patent No.: US 12,197,746 B2
(45) Date of Patent: Jan. 14, 2025

(54) ELECTRONIC DEVICE AND METHOD OF OPERATING THE SAME

(71) Applicant: SK hynix Inc., Gyeonggi-do (KR)

(72) Inventor: In Jong Jang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 146 days.

(21) Appl. No.: 17/876,784

(22) Filed: Jul. 29, 2022

(65) Prior Publication Data

US 2023/0289071 A1 Sep. 14, 2023

(30) Foreign Application Priority Data

Mar. 11, 2022 (KR) ........................ 10-2022-0030918

(51) Int. Cl.
*G06F 21/44* (2013.01)
*G06F 3/06* (2006.01)

(52) U.S. Cl.
CPC .......... *G06F 3/0622* (2013.01); *G06F 3/0637* (2013.01); *G06F 3/0673* (2013.01); *G06F 21/44* (2013.01)

(58) Field of Classification Search
CPC .... G06F 3/0622; G06F 3/0673; G06F 3/0637; G06F 21/44
USPC ....................................................... 713/182
See application file for complete search history.

(56) References Cited

U.S. PATENT DOCUMENTS

| | | | |
|---|---|---|---|
| 9,124,432 B2 * | 9/2015 | Nagai .................. | H04L 9/0869 |
| 10,122,716 B2 * | 11/2018 | Shaw .................. | H04L 63/0876 |
| 2010/0299534 A1 * | 11/2010 | Shim ................... | G06F 21/6218 |
| | | | 713/189 |
| 2015/0074394 A1 * | 3/2015 | Nagai .................. | H04L 9/3226 |
| | | | 713/168 |
| 2015/0074421 A1 * | 3/2015 | Nagai .................. | H04L 9/0822 |
| | | | 713/189 |
| 2015/0301754 A1 * | 10/2015 | Kochar ................ | G06F 3/0679 |
| | | | 711/103 |
| 2015/0326397 A1 * | 11/2015 | Nagai .................. | H04L 9/3263 |
| | | | 713/171 |
| 2015/0341345 A1 * | 11/2015 | Nagai ................. | H04L 63/0823 |
| | | | 713/156 |
| 2017/0185538 A1 * | 6/2017 | Khan ..................... | G06F 21/88 |
| 2017/0337390 A1 * | 11/2017 | Hamilton ............. | H04L 9/0861 |
| 2018/0046805 A1 * | 2/2018 | Le Roy ............... | G06F 21/6245 |
| 2018/0253238 A1 * | 9/2018 | Kotary ................. | G06F 9/4401 |
| 2019/0340393 A1 * | 11/2019 | Mo ....................... | G06F 21/554 |

(Continued)

FOREIGN PATENT DOCUMENTS

KR 10-2014-0044215 A 4/2014

*Primary Examiner* — Samson B Lemma
(74) *Attorney, Agent, or Firm* — IP & T GROUP LLP

(57) ABSTRACT

Provided herein may be an electronic device and a method of operating the same. The electronic device may include a memory device including a replay protected memory block (RPMB) configured to store security data, a memory controller configured to control the memory device, and a host device configured to verify, using a password, an external device coupled thereto wherein the memory controller controls the memory device to read, when the external device is verified, the security data, and wherein the host device is further configured to encrypt the read security data, and transmit, to the verified external device, the encrypted security data, a decryption key for decrypting the encrypted security data, and an RPMB key for accessing the security data.

20 Claims, 12 Drawing Sheets

(56) References Cited

U.S. PATENT DOCUMENTS

2020/0210596 A1\* 7/2020 Cariello ................ G06F 21/79
2020/0250346 A1\* 8/2020 Sasidharan ............ G06F 21/79
2020/0356669 A1\* 11/2020 Kim ..................... G06F 21/544

\* cited by examiner

ELECTRONIC DEVICE AND METHOD OF OPERATING THE SAME

CROSS-REFERENCE TO RELATED APPLICATION

The present application claims priority under 35 U.S.C. § 119(a) to Korean patent application number 10-2022-0030918, filed on Mar. 11, 2022, the entire disclosure of which is incorporated herein by reference.

BACKGROUND

1. Field of Invention

Various embodiments of the present disclosure relate to an electronic device, and more particularly to an electronic device including a memory device, a memory controller, and a host device.

2. Description of Related Art

A storage device is a device which stores data under the control of a host device, such as a computer or a smartphone. The storage device may include a memory device in which data is stored and a memory controller which controls the memory device. Such memory devices are classified into a volatile memory device and a nonvolatile memory device.

The volatile memory device is a memory device in which data is stored only when power is supplied and in which stored data is lost when the supply of power is interrupted. Examples of the volatile memory device include a static random access memory (SRAM) and a dynamic random access memory (DRAM).

The nonvolatile memory device is a memory device in which stored data is retained even when the supply of power is interrupted. Examples of the nonvolatile memory device include a read only memory (ROM), a programmable ROM (PROM), an electrically programmable ROM (EPROM), an electrically erasable and programmable ROM (EEPROM), and a flash memory.

SUMMARY

Various embodiments of the present disclosure are directed to an electronic device which shares secure data, stored in a replay protected memory block (RPMB), with an external device, and a method of operating the electronic device.

An embodiment of the present disclosure may provide for an electronic device. The electronic device may include a memory device including a replay protected memory block (RPMB) configured to store security data, a memory controller configured to control the memory device, and a host device configured to verify, using a password, an external device coupled thereto, wherein the memory controller controls the memory device to read, when the external device is verified, the security data, and wherein the host device is further configured to encrypt the read security data, and transmit to the verified external device, the encrypted security data, a decryption key for decrypting the encrypted security data, and an RPMB key for accessing the security data.

An embodiment of the present disclosure may provide for a method for operating an electronic device including a storage device and a host device. The method may include verifying, using a password, an external device coupled to the electronic device, reading, when the external device is verified, security data stored in a replay protected memory block (RPMB) within the storage device, encrypting the read security data, and transmitting, to the verified external device, the encrypted security data, a decryption key for decrypting the encrypted security data, and an RPMB key for accessing the security data.

An embodiment of the present disclosure may provide for a terminal system. The terminal system may include a first terminal device including a memory device including a replay protected memory block (RPMB) in which security data is stored, a memory controller configured to control the memory device, and a host device configured to generate a one-time password (OTP), and a second terminal device coupled to the first terminal device and configured to obtain authorization from the first terminal device through the OTP, wherein the memory controller controls, when the second terminal device obtains the authorization, the memory device to read the security data, and wherein the host device is further configured to encrypt the read security data, and transmit, to the authorized second terminal device, the encrypted security data, a decryption key for decrypting the encrypted security data, and an RPMB key for accessing the security data.

An embodiment of the present disclosure may provide for an operating method of an electronic device. The operating method may include providing an authenticated device with encrypted first data together with a first decryption key for decrypting the encrypted first data, first data being stored therewithin before the encryption and providing, when the first data is updated to second data therewithin, the authenticated device with encrypted second data together with a second decryption key for decrypting the encrypted second data.

DETAILED DESCRIPTION

Specific structural or functional descriptions in the embodiments of the present disclosure introduced in this specification are illustrated to describe embodiments according to the concept of the present disclosure. The embodiments according to the concept of the present disclosure may be practiced in various forms, and should not be construed as being limited to the embodiments described in the specification.

Figure 1:
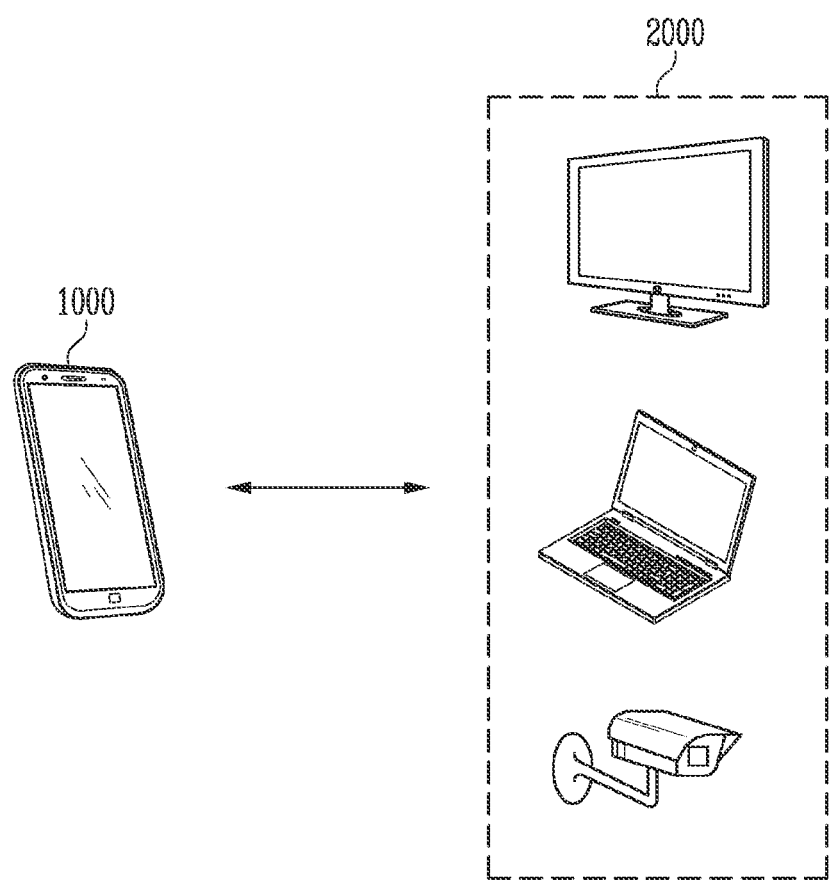
FIG. 1 is a diagram illustrating an electronic device and an external device according to an embodiment of the present disclosure.

FIG. 1 is a diagram illustrating an electronic device and an external device according to an embodiment of the present disclosure.

Referring to FIG. 1, an electronic device 1000 and an external device 2000 are illustrated.

The electronic device 1000 may be a device which can store data under the control of a host device, such as a mobile phone, a srnartphone, an MP3 player, a laptop computer, a desktop computer, a game console, a display device, a tablet PC, or an in-vehicle infotainment system.

The electronic device 1000 may communicate with the external device 2000 to transmit/receive data stored in the electronic device 1000 through various types of communication methods. Establishment of communication connection between the electronic device 1000 and the external device 2000 may include performing communication via a third device (e.g., a repeater, a hub, an access point, a server, a gateway, or the like).

The electronic device 1000 may include various communication modules to perform communication with the external device 2000. For example, the electronic device 1000 may include a wireless communication module, and may include, for example, a cellular communication module using at least one of long-term evolution (LTE), LTE Advanced (LTE-A), code division multiple access (CDMA), wideband CDMA (WCDMA), universal mobile telecommunications system (UMTS), wireless broadband (WiBro), and global system for mobile communications (GSM). In other examples, the wireless communication module may include a module for wireless fidelity (Wi-Fi), radio frequency (RF), or a body area network (BAN).

The external device 2000 may be a device that is capable of performing communication with the electronic device 1000. For example, the external device 2000 may include a smartphone, a tablet PC, a mobile phone, a video phone, an electronic book (e-book) reader, a desktop PC, a laptop PC, a netbook computer, a workstation, a server, a personal digital assistant (PDA), a portable multimedia player (PMP), an MP3 player, a medical device, a camera, or a wearable device. The wearable device may include at least one of an accessory-type device (e.g., a watch, a ring, a bracelet, an ankle bracelet, a necklace, glasses, contact lenses or a head-mounted device (HMD)), a fabric or clothing-integrated type (e.g., electronic clothes), a body-attachment type (e.g., skin pad or tattoo), and a bioimplant-type circuit.

The external device 2000 may include a television, a digital video disk (DVD) player, an audio player, a refrigerator, an air conditioner, a cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™ or PlayStation™), an electronic dictionary, an electronic key, a camcorder, or an electronic picture frame.

In accordance with an embodiment of the present disclosure, the electronic device 1000 and the external device 2000 may share data with each other through mutual communication or may provide a service to a user using the shared data. In particular, the electronic device 1000 may share, with the external device 2000, security data such as the fingerprint, password, etc. of the user and the external device 2000 may provide the user with the service (e.g., payment service). Here, the term "service" means a function provided by an application running on the electronic device 1000 or the external device 2000 or a function provided by the electronic device 1000 or the external device 2000. For example, in a payment-related application, the term "service" may mean a series of processes corresponding to a payment request received from the user. The user may obtain authorization from the electronic device 1000 and the external device 2000 to use the service provided through the electronic device 1000 and the external device 2000, respectively, under the ubiquitous environment. Each of the electronic device 1000 and the external device 2000 may authorize the user based on the shared security data.

Figure 2:
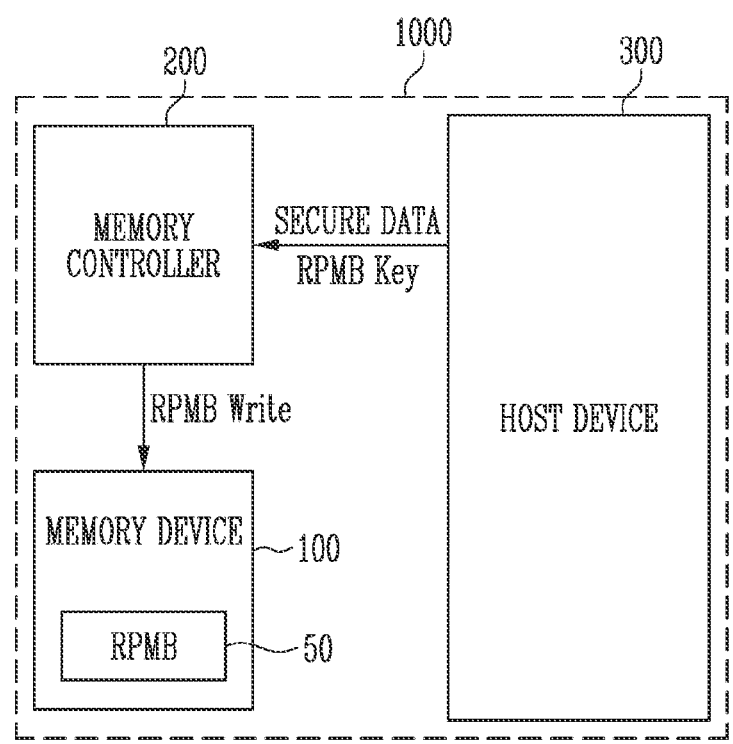
FIG. 2 is a diagram illustrating an electronic device according to an embodiment of the present disclosure.

FIG. 2 is a diagram illustrating an electronic device according to an embodiment of the present disclosure.

Referring to FIG. 2, the electronic device 1000 may include a memory device 100, a memory controller 200, and a host device 300.

The electronic device 1000 may be a device which stores data under the control of the host device 300, such as a mobile phone, a smartphone, an MP3 player, a laptop computer, a desktop computer, a game console, a display device, a tablet PC, or an in-vehicle infotainment system.

Also, the memory device 100 and the memory controller 200 may be implemented as one of various types of storage devices depending on a host interface that is a scheme for communication with the host device 300. For example, a storage device including the memory device 100 and the memory controller 200 may be implemented as one of various types of storage devices, for example, a solid state disk (SSD), a multimedia card such as an MMC, an embedded MMC (eMMC), a reduced size MMC (RS-MMC), or a micro-MMC, a secure digital card such as an SD, a mini-SD, or a micro-SD, a universal serial bus (USB) storage device, a universal flash storage (UFS) device, a personal computer memory card international association (PCMCIA) card-type storage device, a peripheral component interconnection (PCI)-card type storage device, a PCI express (PCI-e or PCIe) card-type storage device, a compact flash (CF) card, a smart media card, and a memory stick.

The memory device 100 and the memory controller 200 may be implemented in one of various types of package forms. For example, the memory device 100 and the memory controller 200 may be implemented in one of various types of package forms, such as package on package (POP), system in package (SIP), system on chip (SOC), multi-chip package (MCP), chip on board (COB), wafer-level fabricated package (WFP), and wafer-level stack package (WSP).

The memory device 100 may store data or use the stored data. In detail, the memory device 100 may be operated in response to the control of the memory controller 200. Further, the memory device 100 may include a plurality of memory dies, each of which may include a memory cell array including a plurality of memory cells which store data.

Each of the memory cells may be implemented as a single-level cell (SLC) capable of storing one data bit, a multi-level cell (MLC) capable of storing two data bits, a triple-level cell (TLC) capable of storing three data bits, or a quad-level cell (QLC) capable of storing four data bits.

The memory cell array may include a plurality of memory blocks. Each memory block may include a plurality of memory cells, and one memory block may include a plurality of pages. Here, each page may be one unit by which data is stored in the memory device 100 or by which data stored in the memory device 100 is read.

The memory device 100 may be implemented as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change RAM (PRAM), a magnetoresistive RAM (MRAM), a ferroelectric RAM (FRAM), or a spin transfer torque RAM (STT-RAM). In the present specification, for convenience of description, a description is made on that the memory device 100 is a NAND flash memory.

The memory device 100 may receive a command and an address from the memory controller 200. The memory device 100 may access an area, selected by the received address, in the memory cell array. Accessing the selected area may mean that an operation corresponding to the received command is performed on the selected area. For example, the memory device 100 may perform a write operation (i.e., a program operation), a read operation, and an erase operation. Here, the program operation may be an operation in which the memory device 100 writes data to an area selected by the address. The read operation may be an operation in which the memory device 100 reads data from an area selected by the address. The erase operation may be an operation in which the memory device 100 erases data stored in an area selected by the address.

The memory controller 200 may control the overall operation of the memory device 100. In detail, when power is applied to the memory controller 200, the memory controller 200 may run firmware (FW). The firmware (FW) may include a host interface layer (HIL) which receives a request input from the host device 300 or outputs a response to the host device 300, a flash translation layer (FTL) which manages an operation between the interface of the host device 300 and the interface of the memory device 100, and a flash interface layer (FIL) which provides a command to the memory device 100 or receives a response from the memory device 100.

The memory controller 200 may receive data and a logical address (LA) from the host device 300, and may translate the logical address into a physical address (PA) indicating the address of memory cells which are included in the memory device 100 and in which data is to be stored. The logical address may be a logical block address (LBA), and the physical address may be a physical block address (PBA).

The memory controller 200 may control the memory device 100 so that a program operation, a read operation or an erase operation is performed in response to a request received from the host device 300. During a program operation, the memory controller 200 may provide a program command, a physical block address, and data to the memory device 100. During a read operation, the memory controller 200 may provide a read command and a physical block address to the memory device 100. During an erase operation, the memory controller 200 may provide an erase command and a physical block address to the memory device 100.

The memory controller 200 may control the memory device 100 so that a program operation, a read operation or an erase operation is internally performed regardless of a request received from the host device 300. For example, the memory controller 200 may control the memory device 100 so that a program operation, a read operation or an erase operation to be used to perform a background operation, such as wear leveling, garbage collection, or read reclaim, is performed.

The host device 300 may communicate with the electronic device 1000 using at least one of various communication methods such as universal serial bus (USB), serial AT attachment (SATA), serial attached SCSI (SAS), high speed interchip (HSIC), small computer system interface (SCSI), peripheral component interconnection (PCI), PCI express (PCIe), nonvolatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

In an embodiment of the present disclosure, the memory device 100 may include a replay protected memory block (RPMB) 50. The RPMB 50 may be an area protected by the memory device 100 and the memory controller 200. Only an authenticated element may access the RPMB 50. In detail, the RPMB 50 may be an area within the memory device 100 and may store security data. Here, the security data may not be accessed without authorization and therefore may be protected from an unauthorized access. Here, an access to the RPMB 50 may include a read operation of reading data from the RPMB 50 and a write operation of storing data into the RPMB 50. For example, the security data may be user information such as the password of the user, fingerprint information of the user, iris information of the user, etc. The RPMB 50 may be an area in which a read operation and a write operation may be performed and may be formed such that the size of the RPMB 50 is a multiple of 128 Kbytes, ranging from a minimum of 128 KB to a maximum of 32 MB.

The memory controller 200 may receive security data and an RPMB key from the host device 300. Here, the RPMB key may be a key conferring authority to access the RPMB 50. When the RPMB key is stored once, the memory controller 200 cannot arbitrarily erase or read the RPMB key.

The memory controller 200 may store the RPMB key received from the host device 300, and may control the memory device 100 so that the memory device 100 stores the security data in the RPMB 50. That is, since the memory controller 200 includes the RPMB key, the memory controller 200 may control the memory device 100 such that the security data is stored in the RPMB 50.

Figure 3:
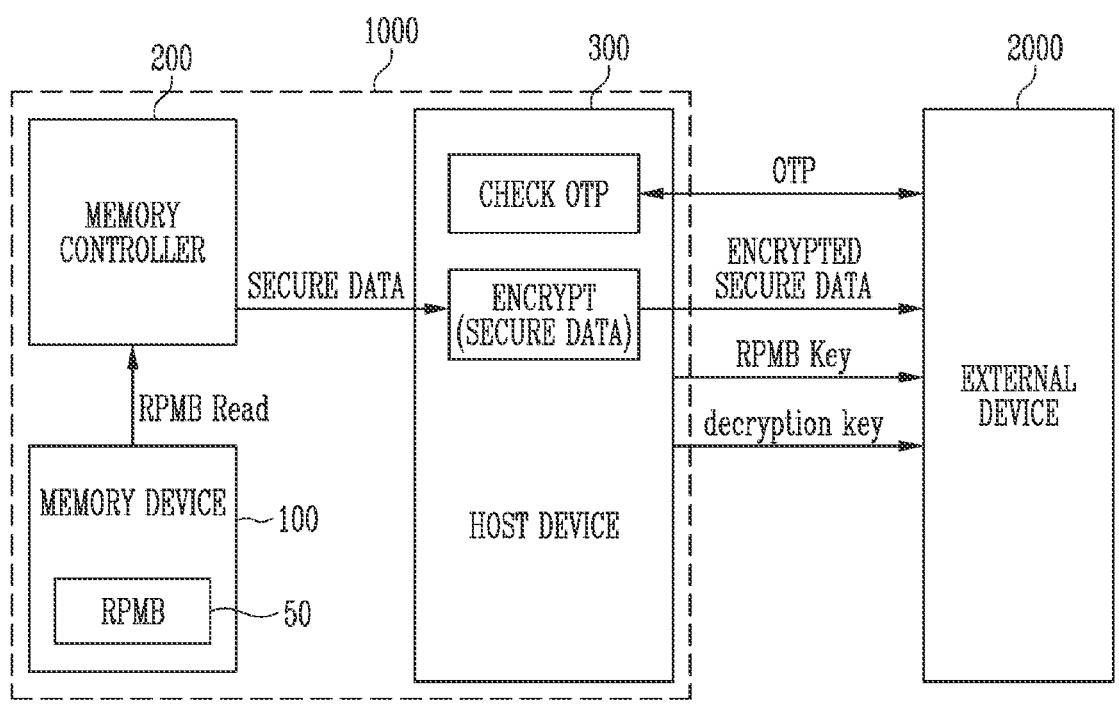
FIG. 3 is a diagram illustrating sharing of secure data according to an embodiment of the present disclosure.

FIG. 3 is a diagram illustrating sharing of security data according to an embodiment of the present disclosure.

Referring to FIG. 3, an example in which an electronic device 1000 and an external device 2000 share security data with each other is illustrated. The electronic device 1000 may share security data stored in an RPMB 50 with the external device 2000. In detail, the electronic device 1000 may verify the external device 2000 coupled to the electronic device 1000 using a password, and may share the security data stored in the RPMB 50 only with the verified external device 2000. Here, the electronic device 1000 may verify the external device 2000 using a one-time password (OTP). Here, the term "OTP" may indicate a one-time personal identification number generated to verify the external device 2000. The electronic device 1000 may generate an OTP to verify the external device 2000 coupled thereto, and may verify the external device 2000 by comparing an OTP received from the external device 2000 with the generated OTP.

When verification of the external device 2000 is completed, the electronic device 1000 may share the security data stored in the RPMB 50 with the external device 2000. In detail, the electronic device 1000 may control the memory device 100 so that the security data stored in the RPMB 50 is read. As described above with reference to FIG. 2, because the memory controller 200 stores the RPMB key, the memory controller 200 may access the RPMB 50 in the memory device 100. Further, the memory controller 200 may control the memory device 100 so that the security data stored in the RPMB 50 is read. The memory controller 200 may transmit the security data received from the memory device 100 to the host device 300.

The host device 300 may encrypt the security data received from the memory controller 200. In detail, the host device 300 may encrypt the security data so as to share the security data with the external device 2000. Further, the security data encrypted by the host device 300 may be transmitted, together with a decryption key and the RPMB key, to the external device 2000. Here, the decryption key may be a key for decrypting the encrypted security data. Also, the RPMB key may be an authority key enabling access to the security data, that is, a key conferring authority to access the RPMB 50.

Further, the external device 2000 may store the encrypted security data, the decryption key, and the RPMB key, received from the electronic device 1000. Further, the external device 2000 may use the encrypted security data, the decryption key, and the RPMB key. In detail, the external device 2000 may perform a security operation of utilizing the security data.

Figure 4:
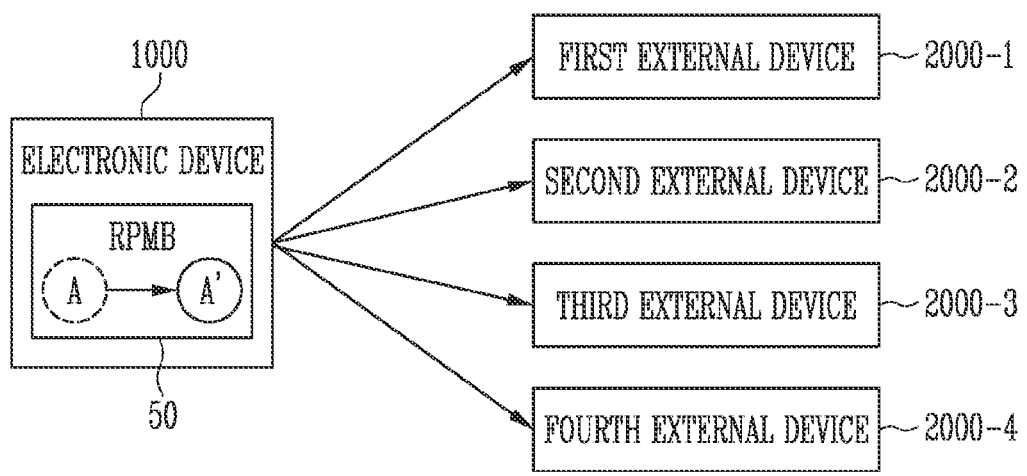
FIG. 4 is a diagram illustrating relationships between an electronic device and a plurality of external devices according to an embodiment of the present disclosure.

FIG. 4 is a diagram illustrating relationships between an electronic device and a plurality of external devices according to an embodiment of the present disclosure.

Referring to FIG. 4, an electronic device 1000 and a first external device 2000-1 to a fourth external device 2000-4 are illustrated. As described above with reference to FIGS. 2 and 3, the electronic device 1000 may share security data or the like with the first external device 2000-1 to the fourth external device 2000-4. For example, the electronic device 1000 may share security data A stored in the RPMB 50 with the first external device 2000-1 to the fourth external device 2000-4. In accordance with an embodiment, the first external device 2000-1 to the fourth external device 2000-4 may perform a security operation of storing the security data and utilizing the stored security data.

Meanwhile, when the security data stored in the electronic device 1000 is updated, an update for the external device 2000 coupled to the electronic device 1000 may be performed. In detail, when the security data A stored in the electronic device 1000 is updated to security data A', an update for the first external device 2000-1 to the fourth external device 2000-4 coupled to the electronic device 1000 may be performed. The electronic device 1000 may perform an update only for the external device 2000 for which authorization for a connection thereto has been verified. Here, the external device 2000 for which the authorization for a connection thereto has been verified may refer to the external device 2000, which has been verified based on an OTP, as described above with reference to FIG. 3.

In accordance with an embodiment of the present disclosure, the electronic device 1000 may encrypt the updated security data and transmit the encrypted security data, together with the RPMB key and the decryption key, to the external device 2000, thus enabling the security data, stored in the external device 2000, to be updated. For example, the electronic device 1000 may encrypt security data A' and transmit the encrypted security data A', a decryption key for decrypting the encrypted security data A', and an RPMB key for accessing the security data A' to the first external device 2000-1 to the fourth external device 2000-4, thus enabling the security data, stored in the first external device 2000-1 to the fourth external device 2000-4, to be updated.

Moreover, before transmitting the security data A', stored in the RPMB 50, to the first external device 2000-1 to the fourth external device 2000-4, the electronic device 1000 may control the memory device 100 so that the memory controller 200 reads the security data A', stored in the RPMB 50, under the control of the host device 300.

Figure 5:
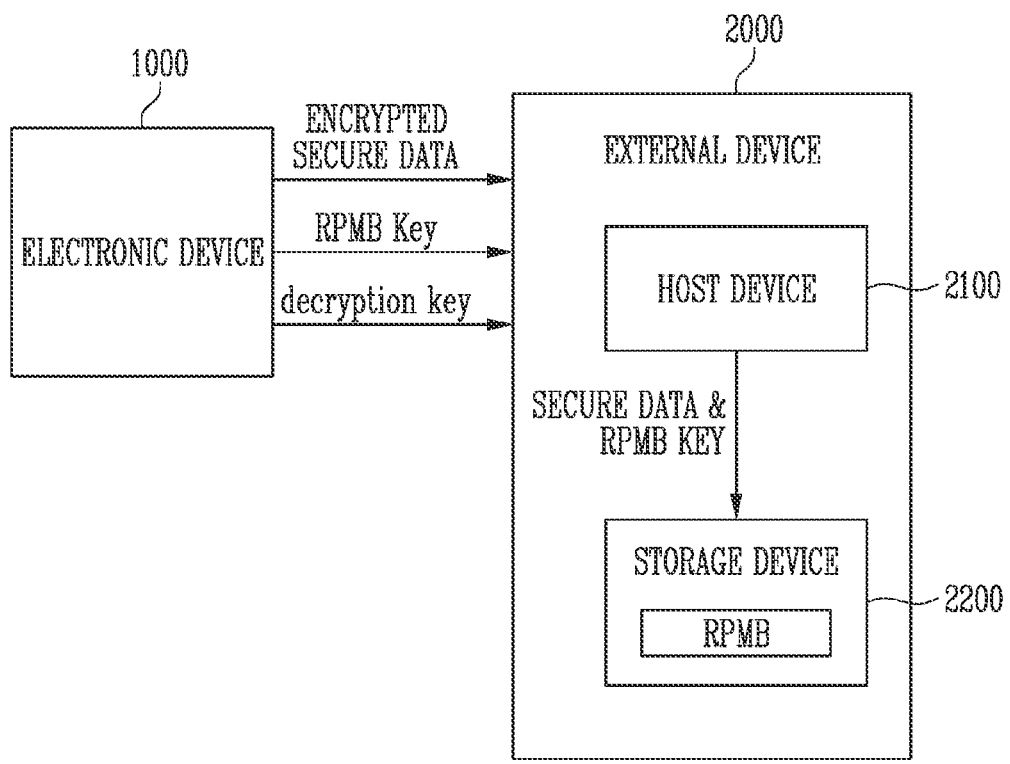
FIG. 5 is a diagram illustrating an external device according to an embodiment of the present disclosure.

FIG. 5 is a diagram illustrating an external device according to an embodiment of the present disclosure.

Referring to FIG. 5, the external device 2000 may receive encrypted security data, an RPMB key, and a decryption key from the electronic device 1000. Also, the external device 2000 may decrypt the encrypted security data using the decryption key. In detail, the external device 2000 may include a host device 2100, and the host device 2100 included in the external device 2000 may decrypt the encrypted security data using the decryption key received from the electronic device 1000, Then, the host device 2100 may control a storage device 2200 so that the security data and the RPMB key are stored in the storage device 2200. The host device 2100 and the storage device 2200, which are included in the external device 2000, may store security data in a RPMB within the external device 2000 using the same method as described above with reference to FIG. 2. The RPMB within the external device 2000 may also be accessed only through an authorization based on the RPMB key provided from the electronic device 1000.

Figure 6:
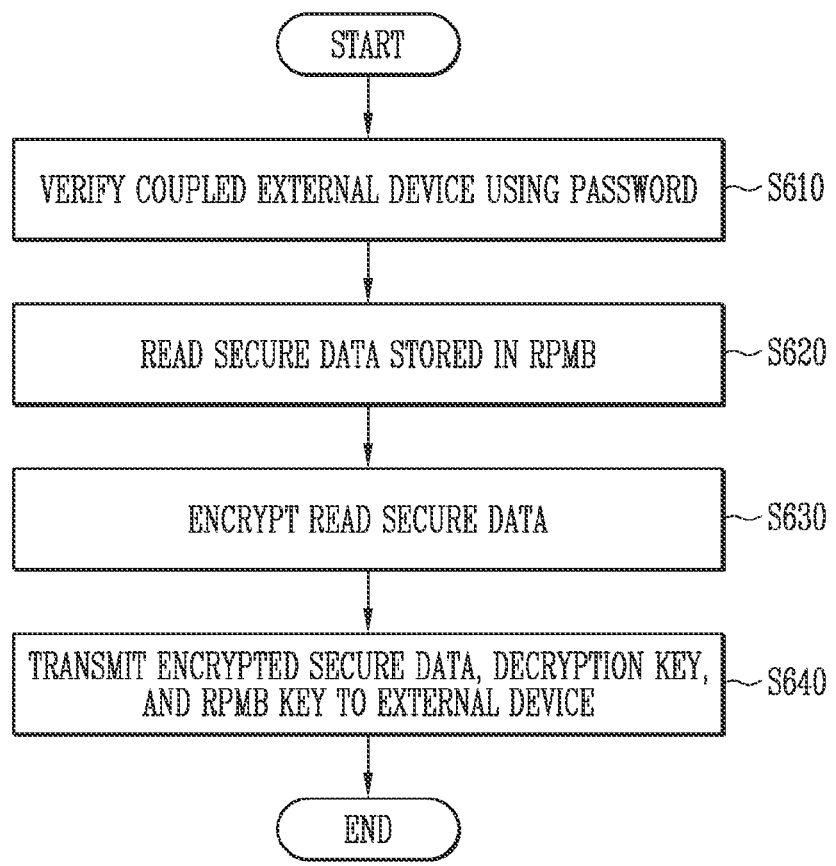
FIG. 6 is a flowchart illustrating a method of operating an electronic device according to an embodiment of the present disclosure.

FIG. 6 is a flowchart illustrating a method of operating an electronic device according to an embodiment of the present disclosure.

First, the electronic device 1000 may verify, using a password, an external device 2000 at operation S610. The electronic device 1000 may verify the external device 2000 coupled thereto before sharing security data. That is, whether the external device 2000 is authorized to share the security data of the electronic device 1000 may be determined.

Also, when the external device 2000 is verified, the electronic device 1000 may read security data stored in a replay protected memory block (RPMB) within the electronic device 1000 at operation S620. In detail, the electronic device 1000 may include a memory device 100, a memory controller 200, and a host device 300. When the external device 2000 is verified by the host device 300, the memory controller 200 may control the memory device 100 so that the security data is read from the RPMB 50 included in the memory device 100. Here, the memory controller 200 may store an RPMB key, and may access the RPMB 50 using the RPMB key.

Further, the electronic device 1000 may encrypt the read security data at operation S630. The electronic device 1000 may encrypt the security data, thus promoting security and safety when the security data is leaked. Furthermore, the electronic device 1000 may transmit the encrypted security data, a decryption key for decrypting the encrypted security data, and an RPMB key for accessing the security data to the external device 2000 at operation S640.

In accordance with an embodiment of the present disclosure, when security data, i.e., first security data, stored in the RPMB 50 is updated to second security data, the electronic device 1000 may perform an update for the external device 2000. That is, the electronic device 1000 may transmit the second security data, updated in the RPMB 50, to the external device 2000. More specifically, the electronic device 1000 may read the second security data, stored in the RPMB 50, and may encrypt the read second security data. Also, the electronic device 1000 may transmit the encrypted second security data, a decryption key for decrypting the encrypted second security data, and an RPMB key for accessing the second security data to the external device 2000.

In accordance with an embodiment of the present disclosure, the external device 2000 may perform a security operation in which the external device 2000 utilizes the security data. In detail, the electronic device 1000 may permit the external device 2000 to perform the security operation in which the external device 2000 utilizes the security data stored therein.

In accordance with an embodiment of the present disclosure, security data may be received from the user and may be stored in the memory device 100 before operation S610. First, the electronic device 1000 may transmit an RPMB key and security data to the memory controller 200. Further, the electronic device 1000 may store the RPMB key in the memory controller 200 and may store the security data in the RPMB 50.

Figure 7:
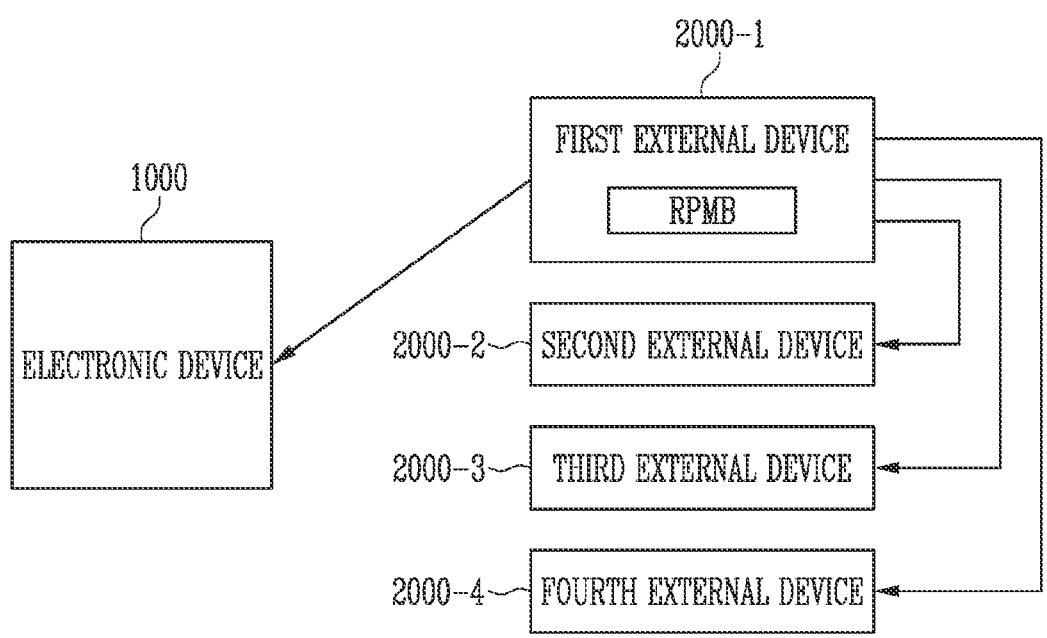
FIG. 7 is a diagram illustrating a method of operating an external device according to an embodiment of the present disclosure.

FIG. 7 is a diagram illustrating a method of operating an external device according to an embodiment of the present disclosure.

Referring to FIG. 7, an electronic device 1000 and a first external device 2000-1 to a fourth external device 2000-4 are illustrated. As described above with reference to FIG. 5, the electronic device 1000 may share security data or the like with the first external device 2000-1 to the fourth external device 2000-4. Similarly, the first external device 2000-1 may also share security data or the like with the second external device 2000-2 to the fourth external device 2000-4, and the first external device 2000-1 may share security data or the like with the electronic device 1000.

In an embodiment, each of the first external device 2000-1 to the fourth external device 2000-4 may include an RPMB, and may be configured such that the security data stored in the RPMB of the first external device 2000-1 is shared with the second external device 2000-2 to the fourth external device 2000-4. In detail, after the electronic device 1000 shares the security data or the like with the first external device 2000-1 to the fourth external device 2000-4, the electronic device 1000 may control, as a master device, the first external device 2000-1 to the fourth external device 2000-4 so that the first external device 2000-1 to the fourth external device 2000-4 are capable of using the security data shared by the electronic device 1000.

Similarly, the first external device 2000-1, as a master device, may control the second external device 2000-2 to the fourth external device 2000-4 and the electronic device 1000. For example, the first external device 2000-1 may request the electronic device 1000 to assign master authority thereto by which the first external device becomes capable of operating as a master device. After the master authority is granted by the electronic device 1000, the first external device 2000-1 may control the second external device 2000-2 to the fourth external device 2000-4. For example, the first external device 2000-1 may permit the second external device 2000-2 to the fourth external device 2000-4 to perform a security operation of utilizing the security data stored in each RPMB.

Figure 8:
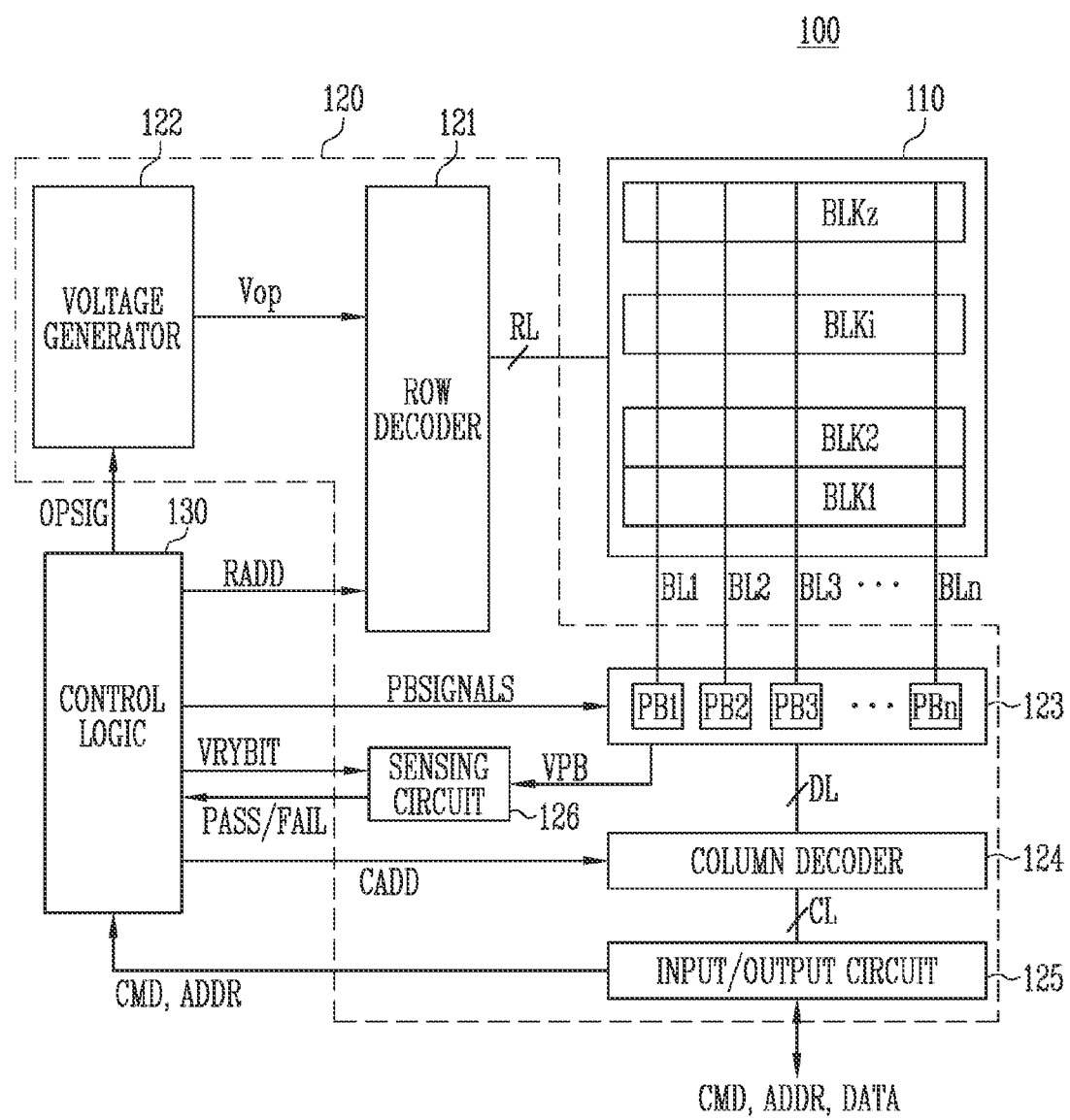
FIG. 8 is a block diagram illustrating a memory device according to an embodiment of the present disclosure.

FIG. 8 is a block diagram illustrating a memory device according to an embodiment of the present disclosure.

Referring to FIG. 8, a memory device 100 may include a memory cell array 110, a peripheral circuit 120, and a control logic 130.

The memory cell array 110 may include a plurality of memory blocks BLK1 to BLKz. The plurality of memory blocks BLK1 to BLKz may be coupled to a row decoder 121 through row lines RL. Here, the row lines RL may include at least one source select line, a plurality of word lines, and at least one drain select line. Each of the memory blocks BLK1 to BLKz may be coupled to a page buffer group 123 through bit lines BL1 to BLn. Each of the memory blocks BLK1 to BLKz may include a plurality of memory cells. In an embodiment, the plurality of memory cells may be nonvolatile memory cells. Memory cells coupled to the same word line may be defined as a single page. Therefore, a single memory block may include a plurality of pages.

Each of the memory cells included in the memory cell array 110 may be implemented as a single-level cell (SLC) capable of storing one data bit, a multi-level cell (MLC) capable of storing two data bits, a triple-level cell (TLC) capable of storing three data bits, or a quad-level cell (QLC) capable of storing four data bits.

The peripheral circuit 120 may perform a program operation, a read operation, or an erase operation on a selected area of the memory cell array 110 under the control of the control logic 130. That is, the peripheral circuit 120 may drive the memory cell array 110 under the control of the control logic 130. For example, the peripheral circuit 120 may apply various operating voltages to the row lines RL and the bit lines BL1 to BLn or discharge the applied voltages under the control of the control logic 130.

The peripheral circuit 120 may include the row decoder 121, a voltage generator 122, the page buffer group 123, a column decoder 124, an input/output circuit 125, and a sensing circuit 126.

The row decoder 121 may be coupled to the memory cell array 110 through the row lines RL. The row lines RL may include the at least one source select line, the plurality of word lines, and the at least one drain select line. In an embodiment, the word lines may include normal word lines and dummy word lines. Further, the row lines RL may further include a pipe select line.

The row decoder 121 may be operated in response to control of the control logic 130. The row decoder 121 may receive a row address RADD from the control logic 130. In detail, the row decoder 121 may decode the row address RADD. The row decoder 121 may select at least one of the memory blocks BLK1 to BLKz according to the decoded address. Further, the row decoder 121 may select at least one word line WL of the selected memory block so that voltages generated by the voltage generator 122 are applied to the at least one word line WL according to the decoded address.

For example, during a program operation, the row decoder 121 may apply a program voltage to a selected word line and apply a program pass voltage having a level lower than that of the program voltage to unselected word lines. During a program verify operation, the row decoder 121 may apply a verify voltage to a selected word line and apply a verify pass voltage higher than the verify voltage to unselected word lines. During a read operation, the row decoder 121 may apply a read voltage to a selected word line and apply a read pass voltage higher than the read voltage to unselected word lines.

In an embodiment, the erase operation of the memory cell array 110 may be performed on a memory block basis. During an erase operation, the row decoder 121 may select one memory block according to the decoded address, and may apply a ground voltage to word lines coupled to the selected memory block.

The voltage generator 122 may be operated under the control of the control logic 130. More specifically, the voltage generator 122 may generate a plurality of voltages using an external supply voltage supplied to the memory device 100 under the control of the control logic 130. For example, the voltage generator 122 may generate a program voltage, a verify voltage, a pass voltage, a read voltage, an erase voltage, etc. under the control of the control logic 130. That is, the voltage generator 122 may generate various operating voltages Vop that are used for program, read, and erase operations in response to an operation signal OPSIG.

In an embodiment, the voltage generator 122 may generate an internal supply voltage by regulating the external supply voltage. The internal supply voltage generated by the voltage generator 122 may be used as an operating voltage for the memory cell array 110.

In an embodiment, the voltage generator 122 may generate a plurality of voltages using the external supply voltage or the internal supply voltage. For example, the voltage generator 122 may include a plurality of pumping capacitors for receiving the internal supply voltage, and may generate a plurality of voltages by selectively enabling the plurality of pumping capacitors under the control of the control logic 130. Also, the plurality of generated voltages may be supplied to the memory cell array 110 by the row decoder 121.

The page buffer group 123 may include first to n-th page buffers PB1 to PBn. The first to nth page buffers PB1 to PBn may be coupled to the memory cell array 110 through the first to n-th bit lines BL1 to BLn, respectively. Further, the first to nth page buffers PB1 to PBn may be operated under the control of the control logic 130. In detail, the first to nth page buffers PB1 to PBn may be operated in response to page buffer control signals PBSIGNALS. For example, the first to n-th page buffers PB1 to PBn may temporarily store data received through the first to nth bit lines BL1 to BLn or may sense voltages or currents of the bit lines BL1 to BLn during a read or verify operation.

In detail, during a program operation, when a program puke is applied to a selected word line, the first to n-th page buffers PB1 to PBn may transfer data DATA, received through the input/output circuit 125, to selected memory cells through the first to nth bit lines BL1 to BLn. The memory cells in the selected page may be programmed based on the received data DATA. Memory cells coupled to a bit line to which a program permission voltage (e.g., a ground voltage) is applied may have increased threshold voltages. The threshold voltages of memory cells coupled to a bit line to which a program inhibition voltage (for example, a supply voltage) is applied may be maintained.

During a program verify operation, the first to n-th page buffers PB1 to PBn may read page data from the selected memory cells through the first to nth bit lines BL1 to BLn.

During a read operation, the first to n-th page buffers PB1 to PBn may read data DATA from the memory cells in the selected page through the first to n-th bit lines BL1 to BLn, and may output the read data DATA to the input/output circuit 125 under the control of the column decoder 124.

During an erase operation, the first to n-th page buffers PB1 to PBn may allow the first to nth bit lines BL1 to BLn to float.

The column decoder 124 may transfer data between the input/output circuit 125 and the page buffer group 123 in response to a column address CADD. For example, the column decoder 124 may exchange data with the first to nth page buffers PB1 to PBn through data lines DL or may exchange data with the input/output circuit 125 through column lines CL.

The input/output circuit 125 may transfer a command CMD and an address ADDR, received from the memory controller 200, to the control logic 130, or may exchange the data DATA with the column decoder 124.

During a read operation or a verify operation, the sensing circuit 126 may generate a reference current in response to an enable bit signal VRYBIT, and may compare a sensing voltage VPB received from the page buffer group 123 with a reference voltage generated by the reference current and then output a pass signal PASS or a fail signal FAIL.

The control logic 130 may control the peripheral circuit 120 by outputting the operation signal OPSIG, the row address RADD, the page buffer control signals PBSIGNALS, and the enable bit VRYBIT in response to the command CMD and the address ADDR.

Further, the control logic 130 may determine whether the verify operation has passed or faded in response to the pass or fail signal PASS or FAIL. Also, the control logic 130 may control the page buffer group 123 so that verify information including the pass or fail signal PASS or FAIL is temporarily stored in the page buffer group 123.

Figure 9:
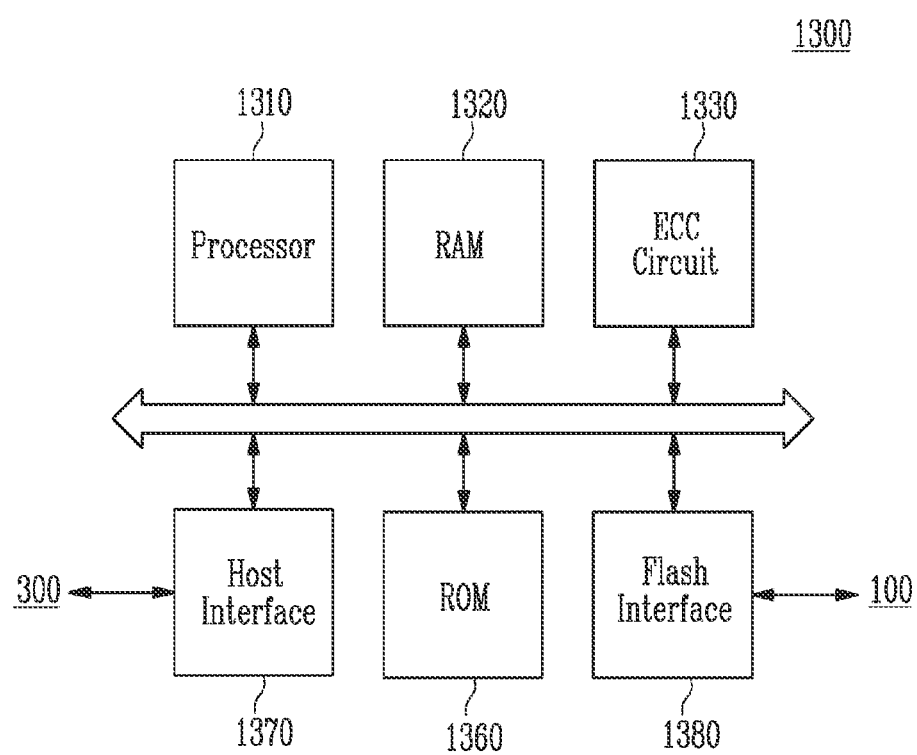
FIG. 9 is a diagram illustrating a memory controller according to an embodiment of the present disclosure.

FIG. 9 is a diagram illustrating a memory controller according to an embodiment of the present disclosure.

Referring to FIG. 9, a memory controller 1300 may include a processor 1310, a RAM 1320, an error correction circuit 1330, a ROM 1360, a host interface 1370, and a flash interface 1380. The memory controller 1300 illustrated in FIG. 9 may be an embodiment of the memory controller 200 illustrated in FIG. 2.

The processor 1310 may communicate with a host device 300 using the host interface 1370, and may perform a logical operation to control the operation of the memory controller 1300. For example, in response to requests received from the host device 300 or an external device, the processor 1310 may load a program command, a data file, a data structure, etc., and may perform various types of operations or generate commands and addresses. For example, the processor 1310 may generate various commands required for a program operation, a read operation, an erase operation, a suspend operation, and a parameter setting operation.

Also, the processor 1310 may perform a function of a flash translation layer (FTL). The processor 1310 may translate a logical block address (LBA), provided by the host device 300, into a physical block address (PBA) through the FTL. The FTL may receive the LBA and translate the LBA into the PBA using a mapping table. Examples of an address mapping method performed through the FTL may include various methods according to a mapping unit. Representative address mapping methods include a page mapping method, a block mapping method, and a hybrid mapping method.

Further, the processor 1310 may generate commands without receiving a request from the host device 300. For example, the processor 1310 may generate commands for background operations such as operations for wear leveling of the memory device 100 and operations for garbage collection of the memory device 100.

The RAM 1320 may be used as a buffer memory, a working memory or a cache memory of the processor 1310. The RAM 1320 may store codes and commands that are executed by the processor 1310. The RAM 1320 may store data that is processed by the processor 1310. Further, in implementation of the RAM 1320, the RAM 1320 may be implemented to include a static RAM (SRAM) or a dynamic RAM (DRAM).

The error correction circuit 1330 may detect errors and correct the detected errors during a program operation or a read operation. In detail, the error correction circuit 1330 may perform an error correction operation based on error correction code (ECC). Also, the error correction circuit 1330 may perform error correction encoding (ECC encoding) based on data to be written to the memory device 100. The ECC-encoded data may be transferred to the memory device 100 through the flash interface 1380. Further, the error correction circuit 1330 may perform error correction decoding (ECC decoding) on data received from the memory device 100 through the flash interface 1380.

The ROM 1360 may be used as a storage unit which stores various types of information required for the operation of the memory controller 1300. In detail, the ROM 1360 may include a map table, in which physical-logical address information and logical-physical address information may be stored. Further, the ROM 1360 may be controlled by the processor 1310.

The host interface 1370 may include a protocol for performing data exchange between the host device 300 and the memory controller 1300. In an embodiment, the host interface 1370 may communicate with the host device 300 through at least one of various interface protocols such as a universal serial bus (USB) protocol, a multimedia card (MMC) protocol, a peripheral component interconnection (PCI) protocol, a PCI-express (PCI-e or PCIe) protocol, an advanced technology attachment (ATA) protocol, a serial-ATA protocol, a parallel-ATA protocol, a small computer system interface (SCSI) protocol, an enhanced small disk interface (ESDI) protocol, an integrated drive electronics (IDE) protocol, and a private protocol.

The flash interface 1380 may communicate with the memory device 100 using a communication protocol under the control of the processor 1310. In detail, the flash interface 1380 may transmit/receive commands, addresses, and data to/from the memory device 100 through a channel. For example, the flash interface 1380 may include a NAND interface.

Figure 10:
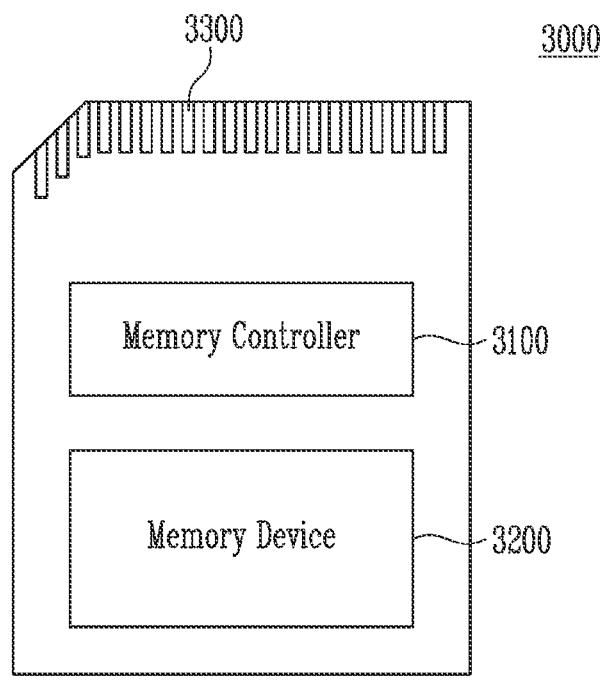
FIG. 10 is a diagram illustrating a memory card system according to an embodiment of the present disclosure.

FIG. 10 is a diagram illustrating a memory card system according to an embodiment of the present disclosure.

Referring to FIG. 10, a memory card system 3000 may include a memory controller 3100, a memory device 3200, and a connector 3300.

The memory controller 3100 may be electrically coupled to the memory device 3200, and may access the memory device 3200. For example, the memory controller 3100 may control read, write, erase, and background operations of the memory device 3200. The memory controller 3100 may provide an interface between the memory device 3200 and a host. Also, the memory controller 3100 may run firmware for controlling the memory device 3200.

For example, the memory controller 3100 may include components, such as a RAM, a processing unit, a host interface, a memory interface, and an error correction circuit.

The memory controller 3100 may communicate with an external device through the connector 3300. The memory controller 3100 may communicate with an external device (e.g., a host) based on a specific communication protocol. In an embodiment, the memory controller 3100 may communicate with the external device through at least one of various communication standards or interfaces such as universal serial bus (USB), multimedia card (MMC), embedded MMC (eMMC), peripheral component interconnection (PCI), PCI-express (PCI-e or PCIe), an advanced technology attachment (ATA) protocol, a serial-ATA (SATA), parallel-ATA (DATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 3300 may be defined by at least one of the above-described various communication standards or interfaces.

In an embodiment, the memory device 3200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin-Transfer Torque Magnetic RAM (STT-MRAM).

The memory controller 3100 and the memory device 3200 may be integrated into a single semiconductor device to form a memory card. For example, the memory controller 3100 and the memory device 3200 may be integrated into a single semiconductor device, and may then form a memory card such as a PC card (i.e., personal computer memory card international association: PCMCIA), a compact flash card (CF), a smart media card (SM or SMC), a memory stick, a multimedia card (MMC, RS-MMC, MMCmicro or eMMC), a SD card (SD, miniSD, microSD, or SDHC), or a universal flash storage (UFS).

Figure 11:
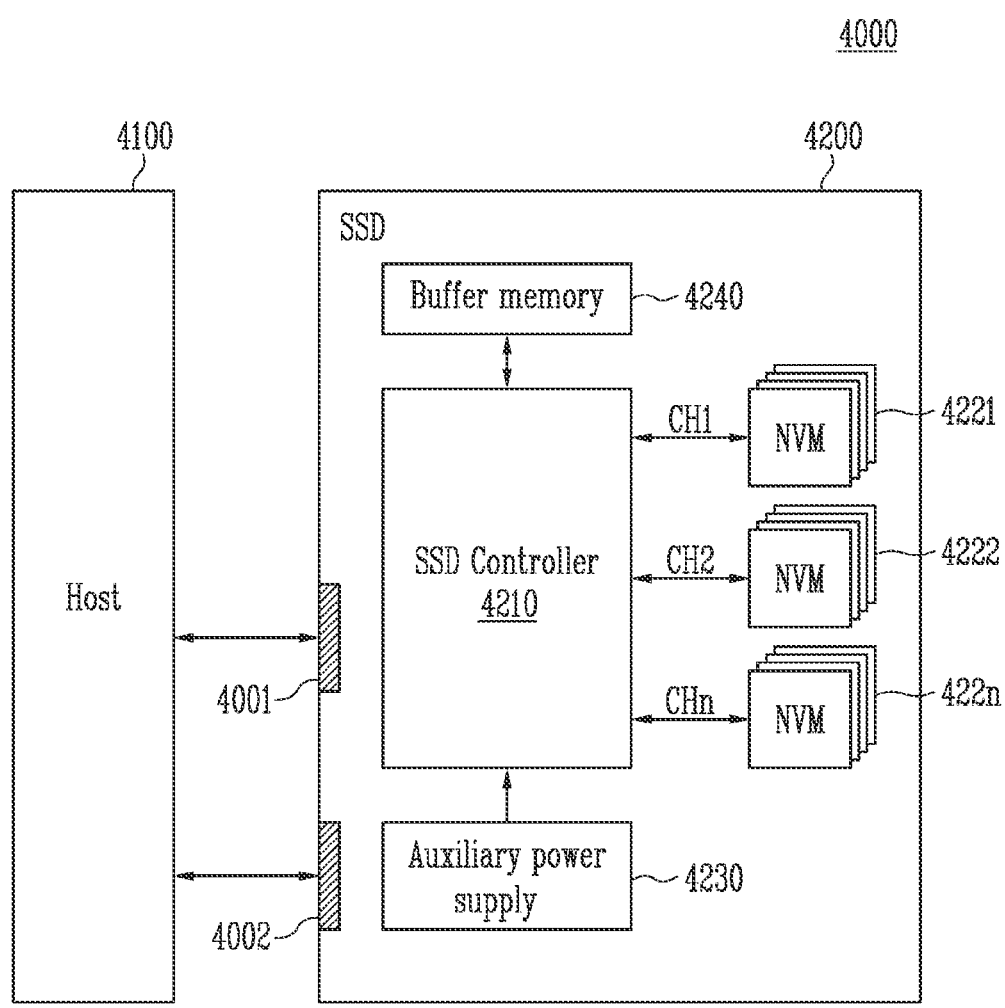
FIG. 11 is a diagram illustrating a solid state drive (SSD) system according to an embodiment of the present disclosure.

FIG. 11 is a diagram illustrating a solid state drive (SSD) system according to an embodiment of the present disclosure.

Referring to FIG. 11, an SSD system 4000 may include a host 4100 and an SSD 4200. The SSD 4200 may exchange a signal SIG with the host 4100 through a signal connector 4001, and may be supplied with power PWR through a power connector 4002. The SSD 4200 may include an SSD controller 4210, a plurality of flash memories 4221 to 422n, an auxiliary power supply 4230, and a buffer memory 4240.

In an embodiment, the SSD controller 4210 may perform a function of the memory controller 200, described above with reference to FIG. 2. The SSD controller 4210 may control the plurality of flash memories 4221 to 422n in response to the signal SIG received from the host 4100. In an embodiment, the signal SIG may indicate signals based on the interfaces of the host 4100 and the SSD 4200. For example, the signal SIG may be a signal defined by at least one of various communication standards or interfaces such as universal serial bus (USB), multimedia card (MMC), embedded MMC (eMMC), peripheral component interconnection (PCI), PCI-express (PCI-e or PCIe), an advanced technology attachment (ATA), serial-ATA (SATA), parallel-ATA (DATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 4230 may be coupled to the host 4100 through the power connector 4002. The auxiliary power supply 4230 may be supplied with power PWR from the host 4100, and may be charged. The auxiliary power supply 4230 may supply the power of the SSD 4200 when the supply of power from the host 4100 is not smoothly performed. In an embodiment, the auxiliary power supply 4230 may be located inside the SSD 4200 or located outside the SSD 4200. For example, the auxiliary power supply 4230 may be located in a main board, and may also provide auxiliary power to the SSD 4200.

The buffer memory 4240 may function as a buffer memory of the SSD 4200. For example, the buffer memory 4240 may temporarily store data received from the host 4100 or data received from the plurality of flash memories 4221 to 422n, or may temporarily store metadata (e.g., mapping tables) of the flash memories 4221 to 422n. The buffer memory 4240 may include volatile memories, such as DRAM, SDRAM, DDR SDRAM, LPDDR SDRAM, and GRAM, or nonvolatile memories, such as FRAM, ReRAM, STT-MRAM, and PRAM.

Figure 12:
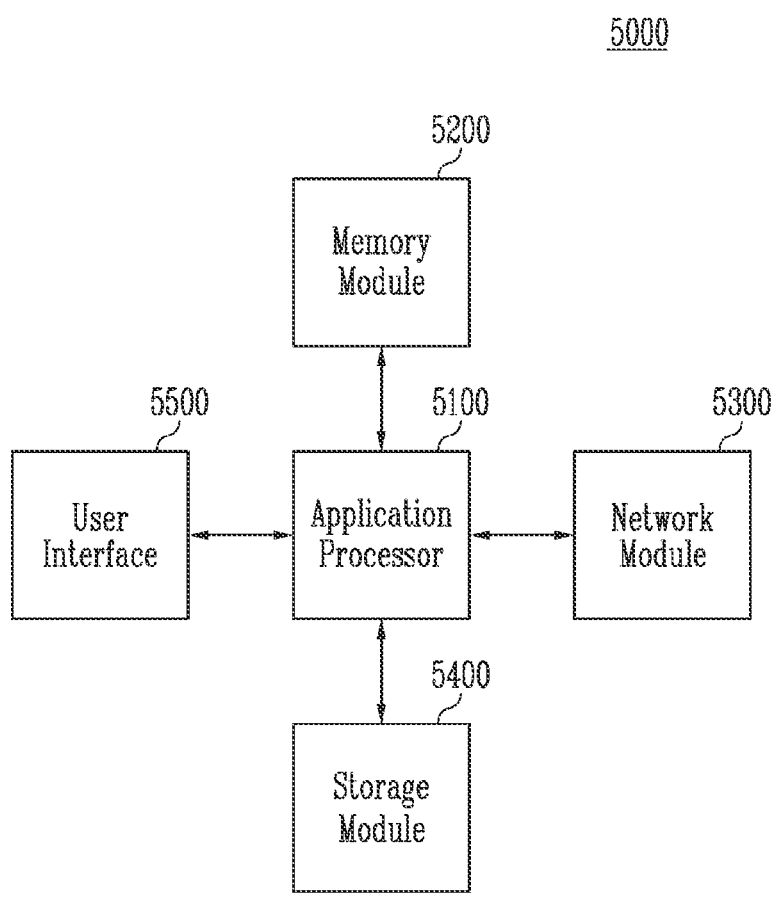
FIG. 12 is a diagram illustrating a user system according to an embodiment of the present disclosure.

FIG. 12 is a diagram illustrating a user system according to an embodiment of the present disclosure.

Referring to FIG. 12, a user system 5000 may include an application processor 5100, a memory module 5200, a network module 5300, a storage module 5400, and a user interface 5500.

The application processor 5100 may execute components included in the user system 5000, an operating system (OS), a user program or the like. In an embodiment, the application processor 5100 may include controllers, interfaces, graphic engines, etc. for controlling the components included in the user system 5000. The application processor 5100 may be provided in the form of a system-on-chip (SoC).

The memory module 5200 may function as a main memory, a working memory, a buffer memory or a cache memory of the user system 5000. The memory module 5200 may include volatile RAMs such as DRAM, SDRAM, DDR SDRAM, DDR2 SDRAM, DDR3 SDRAM, LPDDR SDARM, LPDDR2 SDRAM, and LPDDR3 SDRAM or nonvolatile RAMs such as PRAM, ReRAM, MRAM, and FRAM. In an embodiment, the application processor 5100 and the memory module 5200 may be packaged based on a package-on-package (POP), and may then be provided as a single semiconductor package.

The network module 5300 may communicate with external devices. In an embodiment, the network module 5300 may support wireless communication, such as code division multiple access (CDMA), global system for mobile communication (GSM), wideband CDMA (WCDMA), CDMA-2000, time division multiple access (TDMA), long term evolution (LTE), WiMAX, wireless LAN (WLAN), UWB, Bluetooth, or Wi-Fi. In an embodiment, the network module 5300 may be included in the application processor 5100.

The storage module 5400 may store data. For example, the storage module 5400 may store data received from the application processor 5100. Alternatively, the storage module 5400 may transmit the data stored in the storage module 5400 to the application processor 5100, In an embodiment, the storage module 5400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 5400 may be provided as a removable storage medium (removable drive), such as a memory card or an external drive of the user system 5000.

In an embodiment, the storage module 5400 may include a plurality of nonvolatile memory devices, each of which may be operated in the same manner as the memory device, described above with reference to FIGS. 2 to 4. The storage module 5400 may be operated in the same manner as the memory device 100 and the memory controller 200, described above with reference to FIG. 2.

The user interface 5500 may include interfaces which input data or instructions to the application processor 5100 or output data to an external device. In an embodiment, the user interface 5500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 5500 may include user output interfaces such as a liquid crystal display (LCD), an organic light-emitting diode (OLED) display device, an active matrix OLED (AMOLED) display device, an LED, a speaker, and a monitor.

In accordance with the present disclosure, there are provided an electronic device which shares security data, stored in a replay protected memory block (RPMB), with an external device, and a method of operating the electronic device.

While the present invention has been described with respect to the specific embodiments, it will be apparent to those skilled in the art that various changes and modifications may be made without departing from the spirit and scope of the invention as defined in the following claims. Furthermore, the embodiments may be combined to form additional embodiments.

What is claimed is:

1. An electronic device, comprising:
 a memory device including a replay protected memory block (RPMB) configured to store security data;
 a memory controller configured to control the memory device; and
 a host device configured to verify, using a password, an external device coupled thereto,
 wherein the memory controller controls the memory device to read, when the external device is verified, the security data, and
 wherein the host device is further configured to:
 encrypt the read security data, and
 transmit, to the verified external device, the encrypted security data, a decryption key for decrypting the encrypted security data, and an RPMB key for accessing the security data.

2. The electronic device according to claim 1,
 wherein the security data is first security data, and
 wherein the host device is further configured to control the memory controller and the memory device to perform, when the first security data stored in the RPMB is updated to second security data, an update for the external device.

3. The electronic device according to claim 2, wherein the memory controller controls the memory device to read the second security data.

4. The electronic device according to claim 3, wherein the host device is further configured to:
 encrypt the read second security data, and
 transmit, to the verified external device, the encrypted second security data, a decryption key for decrypting the encrypted second security data, and an RPMB key for accessing the second security data.

5. The electronic device according to claim 1, wherein the host device is further configured to permit the verified external device to perform a security operation which utilizes the security data stored in the verified external device.

6. The electronic device according to claim 1, wherein the host device further configured to, before the external device is verified:

provide the memory device with the security data, which is provided from a use; and control the memory device to store the security data in the RPMB.

7. The electronic device according to claim 6, wherein the host device is further configured to, before the external device is verified:

provide the RPMB key to the memory controller, and control the memory controller to store therein the RPMB key.

8. A method for operating an electronic device including a storage device and a host device, the method comprising:

verifying, using a password, an external device coupled to the electronic device;

reading, when the external device is verified, security data stored in a replay protected memory block (RPMB) within the storage device;

encrypting the read security data; and transmitting, to the verified external device, the encrypted security data, a decryption key for decrypting the encrypted security data, and an RPMB key for accessing the security data.

9. The method according to claim 8, wherein the security data is first security data, further comprising, when the first security data is updated to second security data stored in the RPMB, performing an update for the external device.

10. The method according to claim 9, wherein performing the update comprises:

reading the second security data and encrypting the read second security data; and transmitting, to the verified external device, the encrypted second security data, a decryption key for decrypting the encrypted second security data, and an RPMB key for accessing the second security data.

11. The method according to claim 8, further comprising permitting the verified external device to perform a security operation which utilizes the security data stored in the verified external device.

12. The method according to claim 8, further comprising before the verifying:

receiving the security data from a user; and storing the security data in the RPMB.

13. The method according to claim 12, wherein storing the security data comprises:

transmitting, by the host device, the RPMB key and the security data to the storage device; and storing, by the host device, the RPMB key in a memory controller and storing, by the host device, the security data in the RPMB, the memory controller being included in the storage device.

14. A terminal system, comprising:

a first terminal device including:

a memory device including a replay protected memory block (RPMB) in which security data is stored, a memory controller configured to control the memory device, and a host device configured to generate a one-time password (OTP); and a second terminal device coupled to the first terminal device and configured to obtain authorization from the first terminal device through the OTP, wherein the memory controller controls, when the second terminal device obtains the authorization, the memory device to read the security data, and wherein the host device is further configured to:

encrypt the read security data, and transmit, to the authorized second terminal device, the encrypted security data, a decryption key for decrypting the encrypted security data, and an RPMB key for accessing the security data.

15. The terminal system according to claim 14, wherein the security data is first security data, and wherein the host device is further configured to control the memory controller and the memory device to perform, when the first security data is updated to second security data stored in the RPMB, an update for the second terminal device.

16. The terminal system according to claim 15, wherein the memory controller controls the memory device to read the second security data.

17. The terminal system according to claim 16, wherein the host device is further configured to:

encrypt the read second security data, and transmit, to the authorized second terminal device, the encrypted second security data, a decryption key for decrypting the encrypted second security data, and an RPMB key for accessing the second security data.

18. The terminal system according to claim 14, wherein the host device is further configured to permit the authorized second terminal device to perform a security operation which utilizes the security data stored in the authorized second terminal device.

19. The terminal system according to claim 14, wherein the host device is further configured to, before the second terminal device obtains the authorization:

provide the memory device with the security data, which is provided from a user, and control the memory device to store the security data in the RPMB.

20. The terminal system according to claim 19, wherein the host device is further configured to, before the second terminal device obtains the authorization:

provide the RPMB key to the memory controller, and control the memory controller to store therein the RPMB key.

* * * * *